US007633187B2

(12) United States Patent
Kim et al.

(10) Patent No.: US 7,633,187 B2
(45) Date of Patent: Dec. 15, 2009

(54) STATOR FOR RECIPROCATING MOTOR AND FABRICATION METHOD THEREOF

(75) Inventors: Sung-Jong Kim, Gyeongsangnam-Do (KR); Sang-Sub Jeong, Seoul (KR)

(73) Assignee: LG Electronics Inc., Seoul (KR)

( * ) Notice: Subject to any disclaimer, the term of this patent is extended or adjusted under 35 U.S.C. 154(b) by 269 days.

(21) Appl. No.: 11/140,743

(22) Filed: Jun. 1, 2005

(65) Prior Publication Data

US 2006/0152092 A1 Jul. 13, 2006

(30) Foreign Application Priority Data

Jan. 10, 2005 (KR) .................... 10-2005-0002209

(51) Int. Cl.
*H02K 41/00* (2006.01)
(52) U.S. Cl. ............. 310/12.22; 310/12.23; 310/12.14; 310/164
(58) Field of Classification Search .................. 310/12, 310/14, 15, 164, 194, 263, 12.22, 12.23, 310/12.33; 417/417
See application file for complete search history.

(56) References Cited

U.S. PATENT DOCUMENTS

| 1,303,511 | A | * | 5/1919 | Shackelton ................. 336/205 |
| 3,774,059 | A | | 11/1973 | Cox ........................ 310/49 R |
| 4,816,710 | A | | 3/1989 | Silvaggio et al. |
| 5,318,412 | A | | 6/1994 | Laskaris et al. ............. 417/417 |
| 5,714,822 | A | | 2/1998 | Kawano et al. |
| 5,892,312 | A | | 4/1999 | Hazelton et al. |
| 2002/0046875 | A1 | | 4/2002 | Baumann et al. ......... 174/137 R |
| 2002/0105247 | A1 | | 8/2002 | Park ........................... 310/254 |
| 2003/0137209 | A1 | | 7/2003 | Do et al. ..................... 310/194 |
| 2004/0108774 | A1 | | 6/2004 | Yoon et al. ..................... 310/15 |
| 2004/0208759 | A1 | * | 10/2004 | Hong ....................... 417/410.1 |
| 2004/0245863 | A1 | * | 12/2004 | Hong et al. ..................... 310/14 |
| 2005/0251993 | A1 | | 11/2005 | Starke et al. .................. 29/596 |

FOREIGN PATENT DOCUMENTS

| CN | 1324136 | 11/2001 |
| CN | 2632922 | 8/2004 |

(Continued)

OTHER PUBLICATIONS

PTO 09-0349; Translation of Kunihiro et al., JP 2000197295A, Oct. 2008.*

(Continued)

*Primary Examiner*—Quyen Leung
*Assistant Examiner*—David W. Scheuermann
(74) *Attorney, Agent, or Firm*—KED & Associates, LLP

(57) ABSTRACT

A stator for a reciprocating motor includes a coil winding in which a coil is wound plural times, and fixed and insulated with a bonding material distributed between gaps of the wound coil, an insulation band formed in a circular band shape along an outer circumferential surface of the coil winding, an annular bobbin coupled to both side surfaces of the coil winding and covering the coil winding together with the insulation band, a plurality of core blocks coupled on the bobbin in a circumferential direction, and an inner core inserted with a certain interval from the circular inner circumferential surface formed by the bobbin and the plurality of core blocks.

8 Claims, 7 Drawing Sheets

FOREIGN PATENT DOCUMENTS

| | | |
|---|---|---|
| CN | 1538067 | 10/2004 |
| GB | 116262 | 8/1918 |
| GB | 346248 | 4/1931 |
| JP | 61-180552 | 8/1986 |
| JP | 5-227689 | 9/1993 |
| JP | 6-014487 | 1/1994 |
| JP | 10-004668 | 1/1998 |
| JP | 2000114025 A * | 4/2000 |
| JP | 2000197295 A * | 7/2000 |
| JP | 2000-230578 | 8/2000 |
| JP | 2002-286050 | 10/2002 |
| KR | 20040038543 | 5/2004 |
| WO | 2004006413 | 1/2004 |

OTHER PUBLICATIONS

English Language Abstract of JP 6-014487.
English Language Abstract of JP 2002-286050.
English Language Abstract of JP 2000-230578.
English Language Abstract of CN 1538067.
English Language Abstract of CN 2632922.
English Language Abstract of KR 2004-0038543.
English Language Abstract of CN 1324136.
English Language Abstract of JP 61-180552.
English Language Abstract of JP 5-227689.
English Language Abstract of JP 10-004668.

* cited by examiner

STATOR FOR RECIPROCATING MOTOR AND FABRICATION METHOD THEREOF

BACKGROUND OF THE INVENTION

1. Field of the Invention

The present invention relates to reciprocating motors, and particularly, to a stator of a reciprocating motor and a fabricating method thereof capable of simplifying a fabrication process, and of preventing a dimensional error when using an injection molding.

2. Description of the Conventional Art

A motor converts electrical energy into kinetic energy. Motors are classified into a rotary motor converting electrical energy into a rotary movement is force and a reciprocating motor converting electrical energy into a linear movement force and the like.

FIG. 1 is a lateral cross-sectional view which shows an example of a conventional reciprocating motor. As shown therein, the reciprocating motor includes a stator S having an outer core 100 and an inner core 200 positioned inwardly of the outer core 100, and a mover 300 movable within a gap between the outer core 100 and the inner core 200 of the stator S. The mover 300 includes a permanent magnet 310 and a magnet holder 320 for holding the permanent magnet 310. In the outer core 100, a coil winding 400 is coupled with a bobbin 50 inside of which the coil winding 400 is wound.

The outer core 100 is formed by laminating a plurality of lamination sheets. Each lamination sheet is formed in a "Π" shape (i.e., a "c" or "u" shape) with an open portion 110 between the leg portions thereof being opened inwardly so as to position the coil winding 400 and the bobbin 50 therewith, a base portion 120 positioned on an outer side from the open portion 110 and through which a flux flows, and pole portions 130 extending from both inner ends of the base portion 120 and forming poles.

The inner core 200 is spaced from an inner surface of the outer core 100 by a certain interval, and is formed by laminating lamination sheets of a rectangular shape.

The bobbin 50 is formed in an annular shape, and the coil winding 400 is formed by winding a coil around the bobbin 50 multiple times.

FIG. 2 is an end view showing a reciprocating motor equipped with the stator according to the conventional art.

As shown in the drawing, the outer core of the stator is formed by coupling core blocks LU1 formed by laminating a plurality of radial lamination sheets L1 with a certain thickness to the annular bobbin 50 in the circumferential direction.

An inner surface and an outer surface of each core block LU1 are formed as curved surfaces by the inner and outer edges of the plurality of laminated sheets L1, respectively. The inner surfaces of the core blocks LU1 coupled to the bobbin 50 describe a cylinder, and the outer surfaces thereof maintain certain intervals therebetween.

The bobbin 50 includes an annular body 51 therein in which a winding groove (not shown) of an annular shape is formed in a circumferential direction, and an annular cover 52 covering the winding groove of the annular body 51. The coil winding 400 is located in the winding groove of the annular body 51.

A connection fixing portion 55 of the bobbin 50 has a certain thickness and is formed in a band type with the same width as that of the annular cover 52. The connection fixing portion 55 covers an outer surface of the core blocks LU1, a part of both side surfaces thereof and a part of an outer surface of the bobbin exposed to the exterior between the core blocks LU1. Both side surfaces and the outer surface of the core blocks LU1 are closely adhered with the connection fixing portion 55, and the connection fixing portion 55 is thus extended (protruded) outwardly. That is, the plurality of core blocks LU1 are fixedly-coupled to the bobbin 50 by means of the connection fixing portion 55.

The annular body portion 51 of the bobbin 50 is equipped with a plurality of discharge openings 54 through which humidity is discharged.

A fabrication process of such a stator for a reciprocating motor will be explained herebelow. The bobbin 50 which includes the annular body 51 equipped with the winding groove 53 in an outer circumferential surface thereof is fabricated through a process such as an injection molding process and a cover 52 capable of covering the annular body 51 is fabricated as shown in FIG. 3.

Next, the winding groove 53 of the bobbin 50 is wound with the coated coil 400 therearound multiple times and then the outer circumferential surface of the bobbin 50 is covered with the cover 52.

Afterwards, the core blocks LU1 and LU2 made by laminating a plurality of sheets L1 onto the bobbin 50 are coupled with one another so as to form a cylinder by their inner surfaces, and the outer surfaces thereof are arranged to maintain predetermined intervals therebetween.

The coil winding on which the core block LU1 is arranged is then put into a mold 502, and an over-molding is performed thereon using a die casting method or an injection molding method through an insulator inlet 503. Thus, after completing the outer core 100, the inner core 200 is arranged spaced from an inner circumferential surface of the outer core 100 to thereby obtain a stator.

However, in such a conventionally constructed stator for the reciprocating motor, the bobbin 50 is molded with a plastic material and accordingly it has relatively low strength. As a result, deformation of the bobbin 50 can occur when winding the coil in the winding groove 53 of the bobbin 50, and a wound tension in winding the coil must be adjusted appropriately which disadvantageously makes an assembling process difficult.

Moreover, the stator for the conventional reciprocating motor is fabricated through such processes of winding the coil 400 around the bobbin 50, covering it over with the cover 53, and putting it into the mold 502. As a result, the fabrication processes become complicated and the number of fabrication steps is increased which incurs an increased fabrication cost and a decreased productivity.

In addition, because the injection molding method is used in an over molding process in which the coil winding is coated with an insulating material, the molded object becomes contracted in cooling to thereby cause a dimensional error, and non-uniformity of the product may occur due to a temperature variation of a mold, which increases a defect rate. Also, a temperature of the mold and a pressure condition in an initial molding setting should be set. Therefore, there are several problems such as complicated fabrication processes and an high fabrication cost.

SUMMARY OF THE INVENTION

Therefore, it is an object of the present invention to provide a stator for a reciprocating motor and a fabrication method thereof by which fabrication processes can be simplified and a dimensional error caused by an injection molding can be prevented.

To achieve these and other advantages and in accordance with the purpose of the present invention, as embodied and broadly described herein, there is provided a stator for a reciprocating motor including: an annular coil winding in which a coil is wound plural times and fixed and insulated by a bonding material distributed between the coils, an insulation band formed in a circular band shape along an outer circumferential surface of the coil winding, an annular bobbin coupled to both side surfaces of the coil winding, for covering the coil winding together with the insulation band, a plurality of core blocks coupled on the bobbin in a circumferential direction, and an inner core inserted with a certain interval between itself and the circular inner circumferential surface formed by the bobbin and the plurality of core blocks.

According to the present invention, there is also provided a method for fabricating a stator for a reciprocating motor comprising: a first step of winding a coil around a jig, a second step of heating the wound coil and melting a bonding material positioned at the exterior of the coil and an insulation band covering an outer circumferential surface of the coil winding, to thereby be coupled to the coil, a third step of inserting an annular bobbin so as to cover the annular coil winding; a fourth step of forming lamination sheets of a predetermined shape, a fifth step of forming first and second core block halves by laminating the sheets formed in the fourth step; a sixth step of forming a core block by coupling the first and second core block halves to both side surfaces of the bobbin, respectively, and a seventh step of inserting an inner core so as to maintain a certain interval between the inner core and an inner circumferential surface which is formed by disposing the plurality of core blocks in a circumferential direction of the bobbin, and coupling a first cover and a second cover to the core block, respectively, in an axial direction of the coil winding.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 5, 6, 7, 8, and 9 are diagrams showing fabricating processes of a stator for the reciprocating motor in accordance with the present invention; wherein, FIG. 5 is a cross-sectional view showing a state of winding a coil around a jig;

FIG. 6 is a partially-exploded perspective view showing a state before an insulation band is coupled to an annular coil;

FIG. 7 is a partially-exploded perspective view showing a state after the insulation band is coupled to the annular coil;

FIG. 8 is a cross-sectional view showing a process of coupling the coil winding in a bobbin; and FIG. 9 is a cross-sectional view showing a process of coupling core blocks in the bobbin.

DETAILED DESCRIPTION OF THE INVENTION

Reference will now be made in detail to the preferred embodiments of the present invention, examples of which are illustrated in the accompanying drawings.

Figure 1:
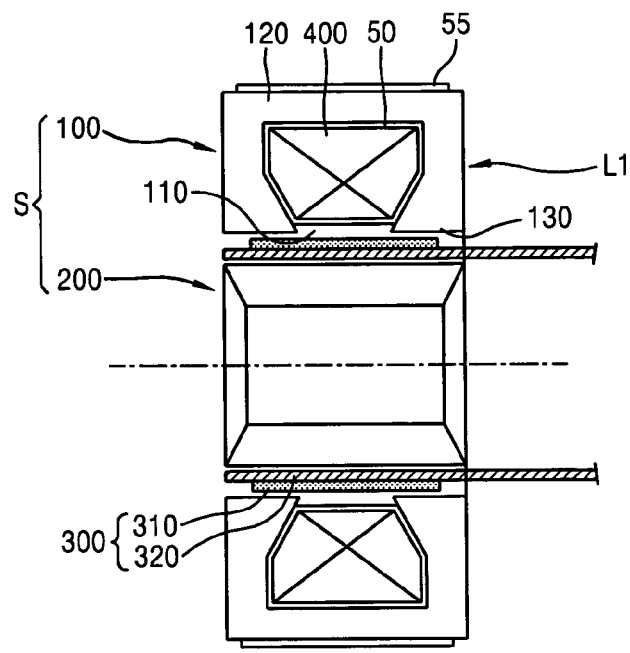
FIG. 1 is a lateral cross-sectional view of a conventional reciprocating motor.
Figure 2:
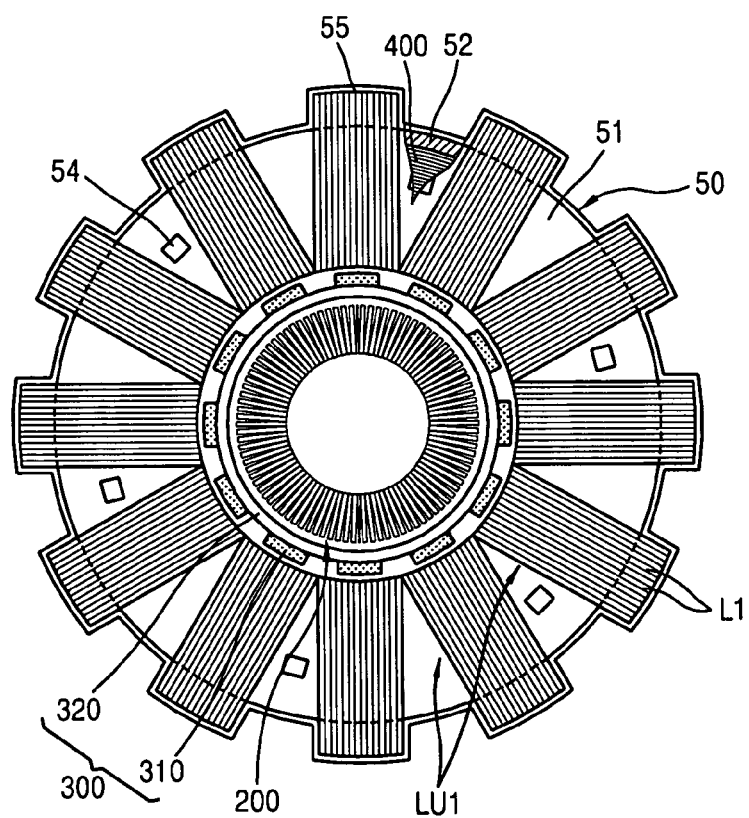
FIG. 2 is an end view of the conventional reciprocating motor.
Figure 3:
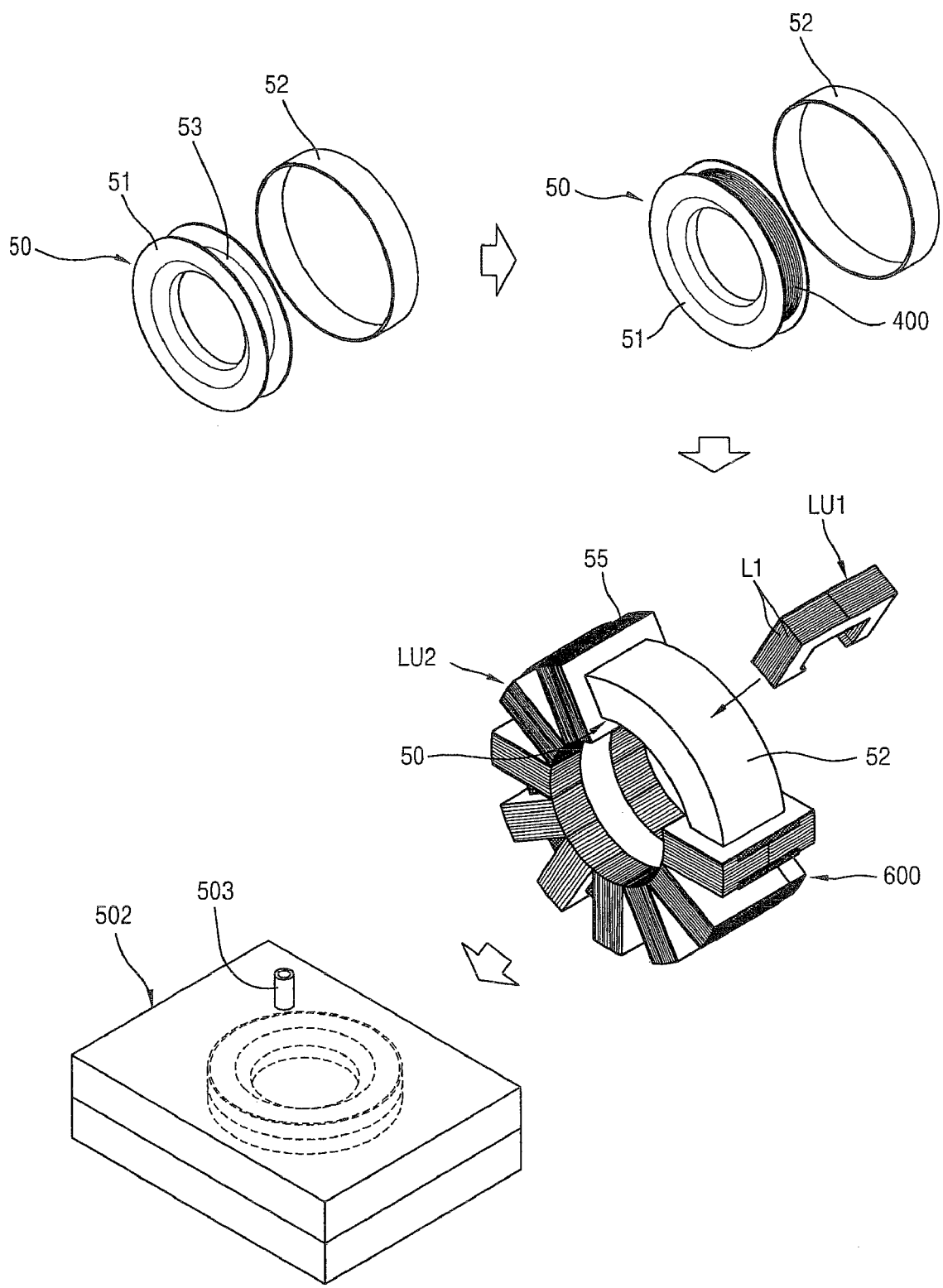
FIG. 3 is a series of perspective views of processing procedures for fabricating a conventional stator for the reciprocating motor.
Figure 4:
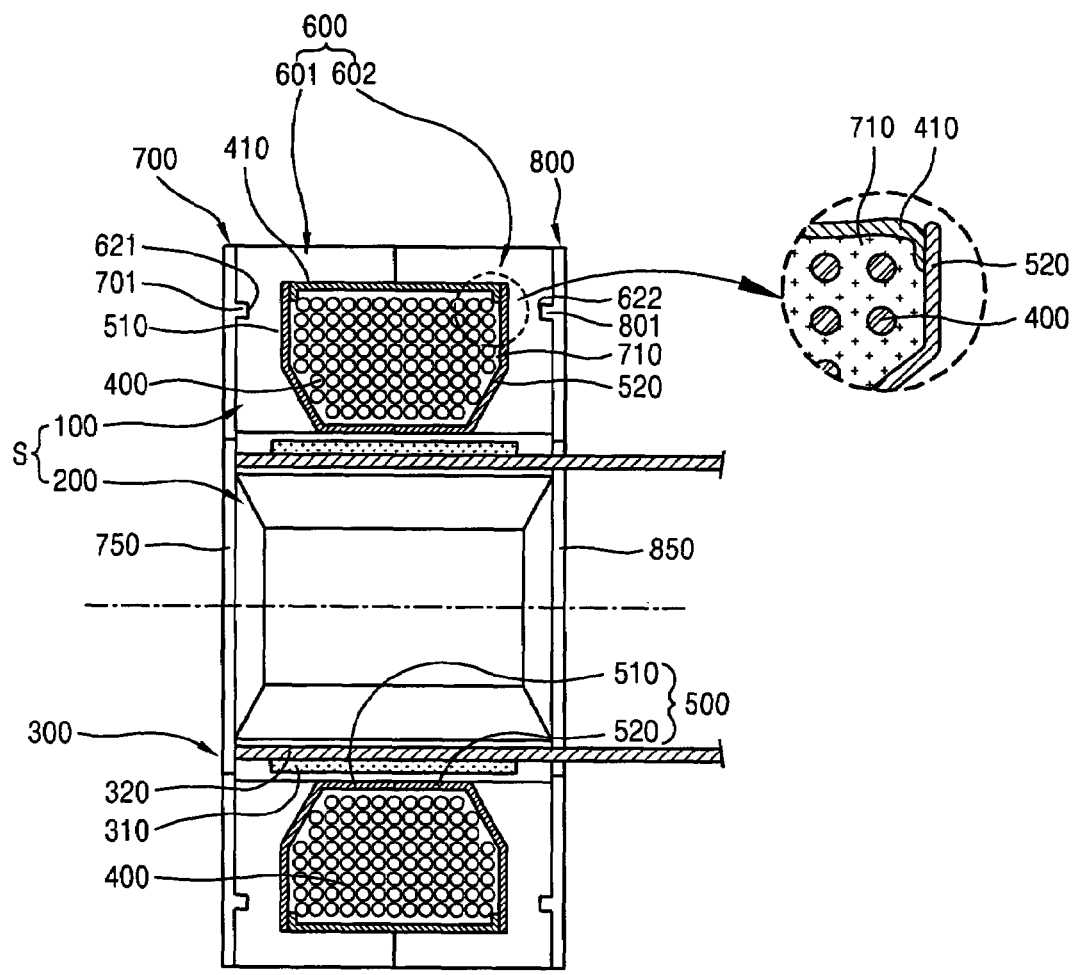
FIG. 4 is a lateral cross-sectional view of a reciprocating motor in accordance with the present invention.

FIG. 4 is a cross-sectional view showing a reciprocating motor having a stator in accordance with the present invention.

As shown therein, the reciprocating motor includes a stator S provided with an outer core 100 and an inner core 200 disposed within the outer core 100, and a mover 300 movably-inserted into a gap between the outer core 100 and the inner core 200 of the stator S. The mover 300 includes one or more permanent magnets 310 and a magnet holder 320 for holding the permanent magnets 310.

The outer core 100 includes an annular coil winding 400 in which a coil is wound multiple times and secured and insulated by a bonding material 710 distributed between the coil windings, an insulation band 410 formed in a circular band shape along an outer circumferential surface of the coil winding 400, for forming an insulating layer, an annular bobbin 500 comprised of two halves 510 and 520 coupled to respective side surfaces of the coil winding 400, for enclosing the coil winding 400 together with the insulation band 410, and a plurality of core blocks 600 coupled therebetween on the bobbin 500 in a circumferential direction.

The coil winding 400 is formed in a ring shape having a regular thickness and width by winding the coil therearound a plurality of times. The bonding material 710 fills gaps between the coil windings so as to insulate the gaps therebetween and maintain the shapes thereof.

The insulation band 410 is formed at an outer circumferential surface of the coil winding 400 so as to cover the outer circumferential surface thereof.

The insulation band 410 has a ring shape with a certain width and thickness. The width thereof can be the same as or greater than that of the outer circumferential surface of the coil winding 400. Preferably, the width of the insulation band 410 is greater than that of the outer circumferential surface of the coil winding 400 so that it encloses even a part of both side surfaces of the coil winding 400 as well as the outer circumferential surface thereof, as shown in the enlarged partial detail view in FIG. 4.

The insulation band 410 is preferably formed of a contractile tube which can be contracted by heating (i.e., heat-shrinkable tubing).

The bobbin 500 is formed by halves 510 and 520 is so as to be separated into two parts formed in a ring shape so as to allow each separated bobbin half to be possibly coupled to the other. When they are coupled to the other, the two halves enclose both side surfaces of the coil winding 400 and an inner circumferential surface thereof. Each one side surface of each bobbin half 510 and 520 overlaps with a part of the insulation band 410 at both the respective side surfaces of the coil winding 400. The bobbin 500 is preferably formed of an insulating material.

Each core block 600 includes a first core block half 601 formed of laminated sheets of a predetermined shape and coupled to one side surface of the coil winding 400, and a second core block half 602 formed the same as the first core block half 601, coupled to the other side surface of the coil winding 400, and joined with the first core block half 601.

The sheets forming the first and second core block halves 601 and 602 have coupling grooves 621 and 622 for respectively being coupled to coupling protrusions 701 and 801 of first and second covers, as will be explained later, at respective outer sides thereof.

The inner and outer surfaces of the core block 600 form curved surfaces, respectively, by the inner and outer edges of the plurality of laminated sheets, and inner surfaces of the plurality of core blocks 600 coupled to the coil winding 400 form a cylinder, while the outer surfaces thereof maintain predetermined intervals therebetween, which is the same as in the conventional art.

The outer side surfaces of the core block 600 are coupled to the first cover 700 and the second cover 800, respectively.

The first cover 700 and the second cover 800 are formed in a annular plate shape having through holes 750 and 850 in their centers, and are respectively equipped with coupling protrusions 701 and 801 in one side thereof so as to couple to corresponding coupling grooves 621 and 622 of the core block 600. The first and second covers 700 and 800 allow the mover 300 to pass through the through holes 750 and 850 positioned in the centers thereof, respectively. In addition, the first and second covers 700 and 800 are respectively coupled to the coupling grooves 621 and 622 of sheets through the coupling protrusions 701 and 801 so as to fix their positions.

Figure 6:
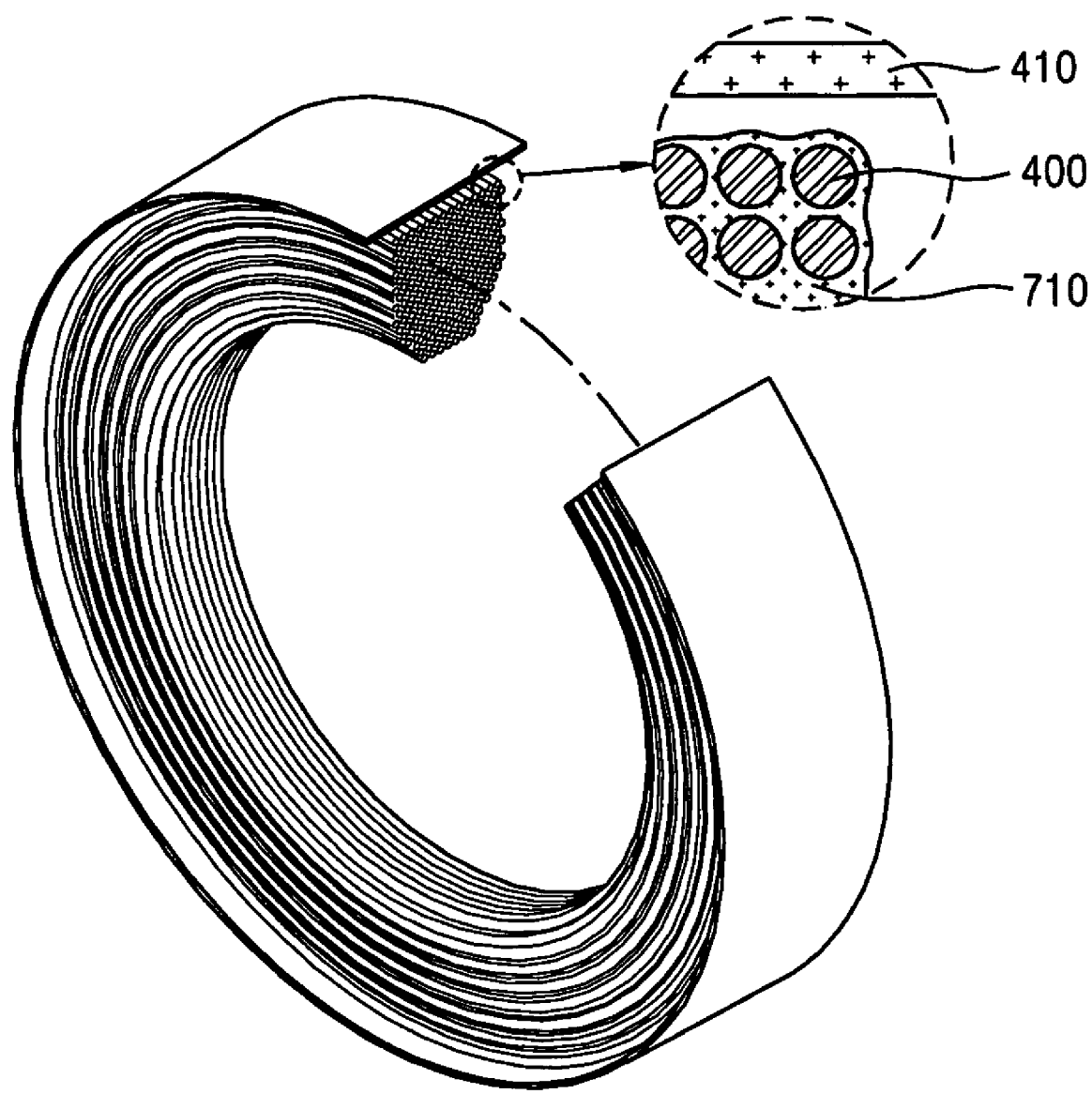
Figure 7:
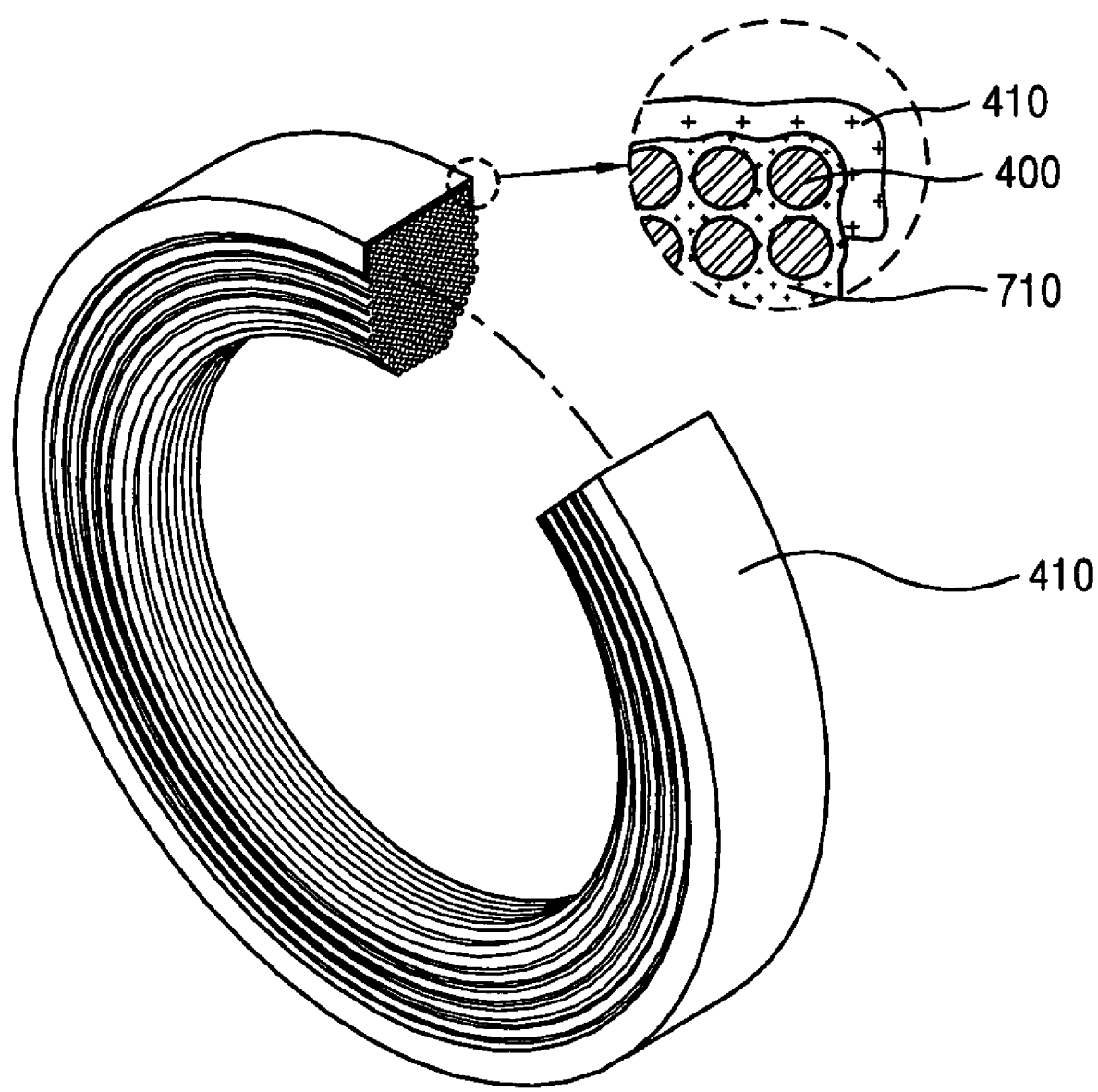
Figure 8:
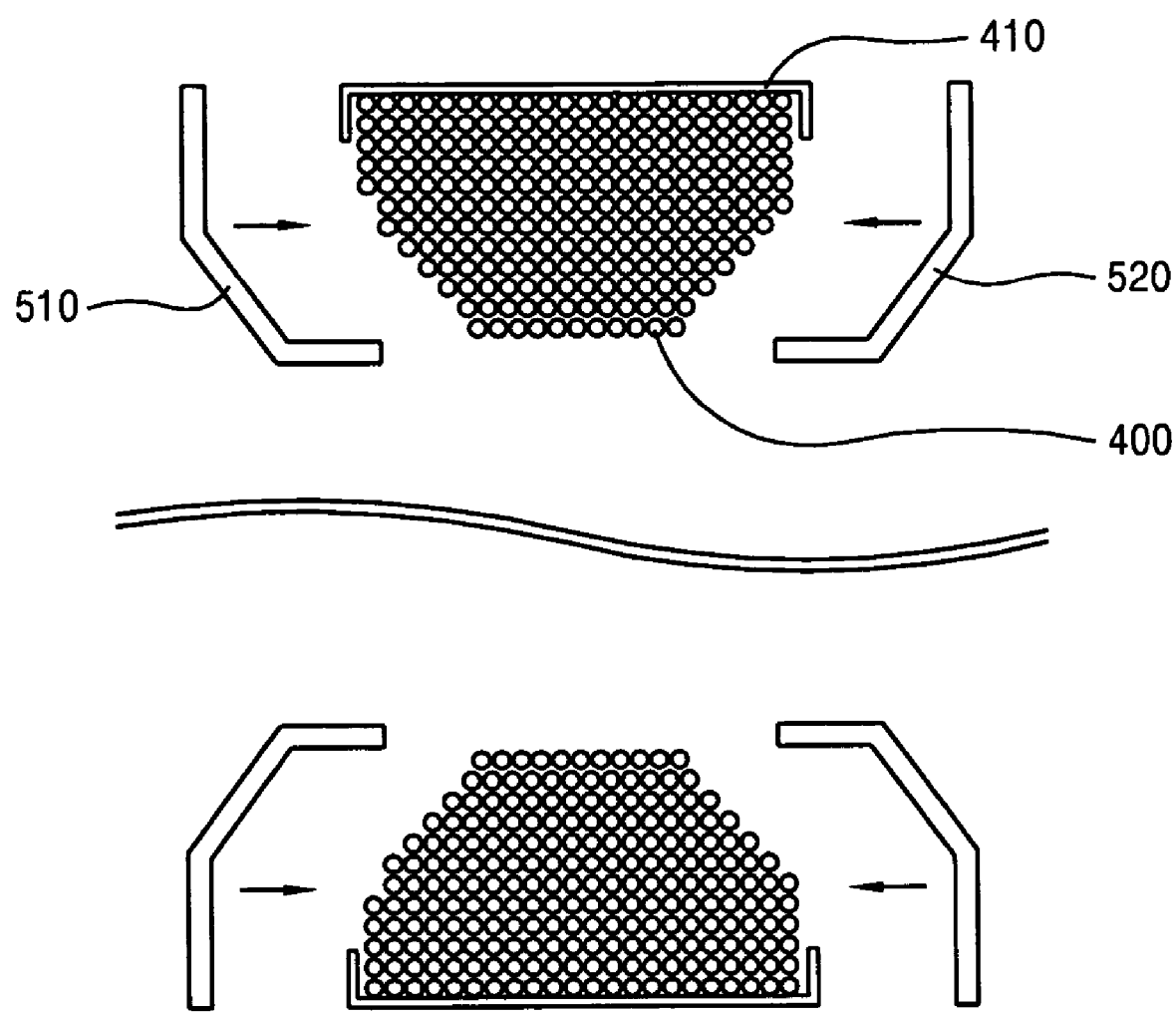
Figure 9:
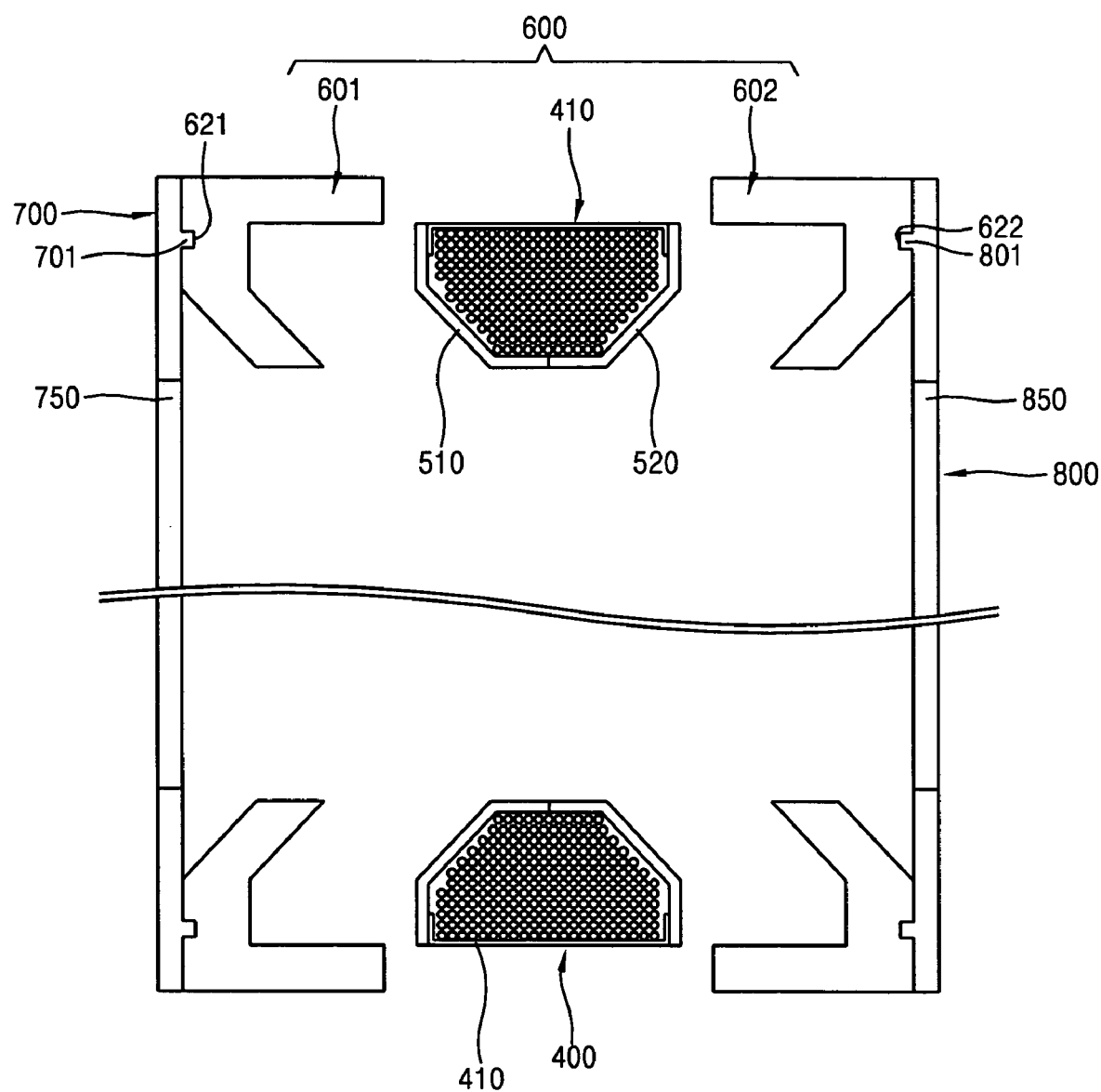

Hereinafter, a fabrication method for the stator for the reciprocating motor according to the present invention will be explained as follows. Fabrication processes for the stator for the reciprocating motor according to the present invention are shown in FIGS. 5, 6, 7, 8, and 9, wherein FIG. 5 is a cross-sectional view showing a state of winding a coil around a jig, FIG. 6 is a partially-exploded perspective view showing a state before the insulation band is coupled to the annular coil, FIG. 7 is a partially-exploded perspective view showing a state after the insulation band is coupled to the annular coil, FIG. 8 is a cross-sectional view showing a process of coupling the coil winding to a bobbin, and FIG. 9 is a cross-sectional view showing a process of coupling the core block to the bobbin.

Figure 5:
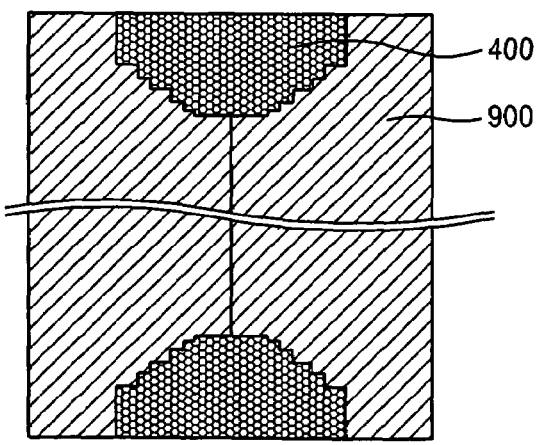

First, as shown in FIG. 5, a separable two-part jig 900 (i.e., coil former) is prepared having a central groove therein around which the coil 400 is able to be wound in a circumferential direction, and the coil 400 is wound around the groove of the jig 900 as many times as desired. Here, the jig 900 has a sufficient degree of strength so that the wound tension of the coil 400 can be adjusted and the number of windings in the coil 400 and the shape thereof can easily be designated.

Next, in order to heat the coil winding 400, an electric current is applied to the coil 400 wound around the jig 900 or other methods are used, so as to melt the bonding material 710 positioned at the outermost layer of the coil 400. As a result, gaps between coils 400 are abutted and filled therebetween. In other words, when heating the coil winding 400, the bonding material 710 positioned at the outermost layer (at the exterior) of the coil 400 is melted to fill the gaps between the coils. Afterwards, the the parts of the jig 900 are separated and coil winding 400 is separated from the jig 900. That is, since the coil winding 400 is fixed by the bonding material 710, it can be separated from the jig 900 while still maintaining its ring shape. Then, as shown in FIG. 6, the insulation band 410 of a ring shape is inserted onto an outer circumferential surface of the thusly separated annular coil winding 400. As can then be seen in FIG. 7, when the coil winding 400 undergoes a high temperature exposure, the insulation band 410 is contracted so as to be closely adhered and coupled with the outer circumferential surface and a part of each side surface of the coil winding 400. The high temperature exposure refers to an area to be possibly heated above a temperature at which the insulation band can be contracted and deformed (e.g., a furnace of a high temperature).

Other methods may be used in this step. That is, the second step can be performed by including a coupling step of winding the insulation band around the outer circumferential surface of the coil wound around the jig; and a heating step of heating the coil winding and thus melting the bonding material positioned at the outermost layer of the coil and the insulation band so as to abut the windings therebetween and couple the insulation band to the coil as well.

Next, as shown in FIG. 8, the two separated parts 510 and 520 of the annular bobbin 500 are then respectively coupled together with both side surfaces of the coil winding 400 therebetween. At this time, one side of each bobbin half 510 and 520 partially overlaps with the insulation band 410 at the both side surfaces of the coil winding 400.

Thereafter, a plurality of first and second core block halves 601 and 602 are made by forming sheets of a predetermined shape and laminating the formed sheets so that inner and outer circumferential surfaces thereof have predetermined curvatures.

Each first core block half 601 is coupled to the first cover 700 using the coupling groove 621 and the coupling protrusion 701, and each second core block half 602 is coupled to the second cover 800. As explained above, the inner surfaces of the plurality of first and second core block halves form a cylinder and the outer surfaces thereof maintain certain intervals therebetween.

The first core block halves 601 coupled to the first cover 700 are coupled to one outer side surface of the bobbin 500 and the inner core 200 is inserted therein, and the second core block halves 602 coupled to the second cover 800 are coupled to the other outer side surface of the bobbin 500. The first cover 700 and the second cover 800 are then coupled together by a fastening such as bolting, and the abutted inner side surfaces of the first and second core blockhalves 601 and 602 can be coupled together by joining techniques such as welding.

In the method of the present invention, the first and second core block halves are first coupled to the covers and then arranged at the outer circumferential surface of the bobbin. However, it is also possible to use a method in which the first and second core block halves are arranged at the outer circumferential surface of the bobbin, the inner core is inserted thereinto, and then the first and second covers are coupled thereto.

As described so far, the stator for the reciprocating motor according to the present invention does not need a bobbin for winding a coil and a cover. As a result, fabrication costs and processes can effectively be reduced according to the reduction in the number of components.

In addition, unlike the conventional art in which because the injection molding method is used, the molded object is contracted on cooling to thereby cause a dimensional error and non-uniformity of the product is caused by a temperature variation of a mold which increases the defect rate, in the present invention, several problems which previously occurred in the injection molding can be avoided by eliminating the injection molding process from the over molding operation for coating the insulating material on the coil winding.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A stator for a reciprocating motor, comprising:
   an annular coil winding in which a coil is wound plural times;
   an insulation band formed in a circular band shape surrounding an outer circumferential surface of the coil winding;
   an annular bobbin coupled to remaining outer surfaces of the coil winding so as to enclose the coil winding together with the insulation band, wherein the bobbin comprises two separate parts that are coupled to respective opposite side surfaces of the coil winding;
   a plurality of core blocks coupled on the bobbin in a circumferential direction; and
   an inner core disposed within the bobbin, with a certain interval between an outer circumferential surface of the inner core and an inner circumferential surface of the bobbin, wherein the insulation band extends continuously in a longitudinal direction around the outer circumferential surface of the coil winding, and wherein a width of the insulation band that is transverse to the longitudinal direction is greater than that of the outer circumferential surface of the coil winding such that opposite end portions of the insulation band cover a portion of the opposite side surfaces of the coil winding, and wherein the annular coil winding is an annular solid comprising a bonding material that forms the insulation band positioned at an outermost layer of the coil winding and melted and then solidified within gaps between the plural windings so as to fix the annular shape of the coil winding prior to covering the plural windings with the insulation band and the two separate pieces of the bobbin.

2. The stator of claim 1, wherein each of the plurality of core blocks includes:
   a first core block half comprising a plurality of laminated sheets and coupled to a first side surface of the bobbin; and
   a second core block half formed the same as the first core block half, and coupled to the a second side surface of the bobbin.

3. The stator of claim 1, wherein the insulation band is formed of a contractile tube which is contracted by heating.

4. The stator of claim 1, wherein outer surfaces of the plurality of core blocks are coupled to a corresponding portion of a cover, the cover being formed in an annular plate shape having through holes.

5. The stator of claim 1, wherein the opposite end portions of the insulation band are bent.

6. The stator of claim 5, wherein each of the plurality of core blocks has a coupling groove formed therein that is configured to be coupled to a corresponding coupling protrusion formed in a corresponding portion of a cover.

7. A stator for a reciprocating motor, comprising:
   an annular coil winding in which a coil is wound plural times;
   an insulation band that surrounds an outer circumferential surface of the coil winding, wherein the insulation band has a ring shape that extends continuously in a longitudinal direction around the outer circumferential surface of the coil winding, and a width of the insulation band that is transverse to the longitudinal direction is greater than that of the outer circumferential surface of the coil winding so as to cover a part of two opposite side surfaces of the coil winding as well as the outer circumferential surface of the coil winding;
   an annular bobbin coupled to the two opposite side surfaces of the coil winding so as to enclose the coil winding together with the insulation band, wherein the annular bobbin comprises two separate parts each coupled to a respective side surface of the two opposite sides surfaces of the coil winding;
   a plurality of core blocks coupled on the bobbin in a circumferential direction, the plurality of core blocks including first core blocks coupled to a first side of the bobbin and second core blocks coupled to a second side of the bobbin;
   an inner core positioned so as to maintain a certain interval between an outer circumference thereof and an inner circumferential surface of the bobbin;
   a first cover coupled to the first core blocks; and
   a second cover coupled to the second core blocks, wherein each of the plurality of core blocks has a coupling groove formed therein, and each of the first and second covers has corresponding coupling protrusions configured to be respectively coupled with the coupling grooves so as to couple the first and second covers to the first and second core blocks, and wherein the annular coil winding is an annular solid comprising a bonding material that forms the insulation band positioned at an outermost layer of the coil winding and melted and then solidified within gaps between the plural windings so as to fix the annular shape of the coil winding prior to covering the plural windings with the insulation band and the two separate pieces of the bobbin.

8. The stator of claim 7, wherein opposite end portions of the transverse width of the insulation band are bent.

* * * * *